(12) United States Patent
Murphy (10) Patent No.: US 10,082,157 B2
(45) Date of Patent: Sep. 25, 2018

(54) THROUGH WALL CONNECTOR FOR A MULTI-CHAMBER PRESSURE VESSEL

(71) Applicant: Flexcon Industries, Inc., Randolph, MA (US)

(72) Inventor: Lucas Murphy, North Easton, MA (US)

(73) Assignee: Flexcon INDUSTRIES, INC., Randolph, MA (US)

( * ) Notice: Subject to any disclaimer, the term of this patent is extended or adjusted under 35 U.S.C. 154(b) by 0 days.

(21) Appl. No.: 15/312,945

(22) PCT Filed: May 27, 2015

(86) PCT No.: PCT/US2015/032552
§ 371 (c)(1),
(2) Date: Nov. 21, 2016

(87) PCT Pub. No.: WO2015/183873
PCT Pub. Date: Dec. 3, 2015

(65) Prior Publication Data
US 2017/0184132 A1    Jun. 29, 2017

Related U.S. Application Data

(60) Provisional application No. 62/004,012, filed on May 28, 2014.

(51) Int. Cl.
*B65D 1/32* (2006.01)
*F15B 1/08* (2006.01)
(Continued)

(52) U.S. Cl.
CPC .............. *F15B 1/08* (2013.01); *F16L 55/053* (2013.01); *F15B 1/00* (2013.01)

(58) Field of Classification Search
CPC ............... F15B 1/00–1/24; F16L 55/00; F16L 55/04–55/053
(Continued)

(56) References Cited

U.S. PATENT DOCUMENTS 3,137,317 A * 6/1964 Peters ....................... F15B 1/14
138/30
3,931,834 A * 1/1976 Caillet ....................... F15B 1/14
138/30

(Continued)

*Primary Examiner* — Kareen Thomas
(74) *Attorney, Agent, or Firm* — Barry G. Magidoff; Paul J. Sutton (57) ABSTRACT

A gas and liquid-tight inlet connector to the inner chamber of a mufti-chamber pressure vessel is provided, comprising: a male gland extending through an orifice in the bottom of the flexible wall of the inner chamber and the lower wall of the rigid outer shell of the vessel, the male gland comprising an upper flange permanently, sealingly connected, with the lower surface of the flexible inner wall, so as to form a gas- and liquid-tight seal therewith, and a lower elongated member extending through the outer shell to be sealingly connected with a liquid inlet pipe, permitting liquid flow into the inner chamber, while maintaining the seal between the inner and outer chambers of the tank, thus maintaining pressurization in the outer chamber, as fluid enters the inner chamber, pushing the flexible wall upwardly into the outer chamber.

8 Claims, 10 Drawing Sheets

(51) Int. Cl.
*F16L 55/053* (2006.01)
*F15B 1/00* (2006.01)

(58) Field of Classification Search
USPC ....... 220/720, 722, 721, 723, 581–592, 609,
220/626, 495.01, 23.86, 23.87, 23.9,
220/62.11, 62.21
See application file for complete search history.

(56) References Cited

U.S. PATENT DOCUMENTS

| | | |
|---|---|---|
| 6,915,922 B2 | 7/2005 | Wang |
| 7,322,488 B2 | 1/2008 | Lombari et al. |
| 2005/0017016 A1* | 1/2005 | Lombari ............... F16L 55/053 |
| | | 220/721 |
| 2008/0230134 A1 | 9/2008 | Lai |
| 2009/0151707 A1 | 6/2009 | Davis et al. |
| 2010/0000920 A1* | 1/2010 | Martinello ................ E03B 7/07 |
| | | 210/137 |
| 2014/0158573 A1* | 6/2014 | Van Haaren .......... F16L 55/053 |
| | | 206/459.1 |

* cited by examiner

THROUGH WALL CONNECTOR FOR A MULTI-CHAMBER PRESSURE VESSEL

BACKGROUND OF INVENTION

Field of the Invention

This application relates to a novel connector for providing a gas and liquid-tight connection between an inlet water pipe and the inner chamber of a multi-chamber pressure vessel.

Background

Such multi-chamber tanks, usually comprising two chambers separated by a at least a partially flexible, non-metal diaphragm, are quite common in the water storage field, for holding, e.g., potable well water. Most commonly used for holding aqueous liquids, such multi-chamber vessels usually comprise a metal, e.g., steel or aluminum, outer vessel, and a non-metallic, inner water-holding vessel. There has been an onoing difficulty in maintaining a water-tight and air-tight separation between the two volumes. The difficulty, and long term problem, has involved the connection between the metal inlet tube to the non-metallic inner vessel wall with a long-lasting gas-tight and liquid-tight seal, that also forms a tight seal with the outer metal wall.

The present invention differs from the prior art in providing for a permanently affixed connection between the inner wall (partially formed of a flexible diaphragm) separating the water liquid chamber from the air gas chamber of the tank, which provides for a fully secure watertight and airtight connection to avoid any potential likelihood of leakage of gas into the liquid, e.g., potable water, within the diaphragm chamber, or of potentially damaging liquid into the gas chamber, and indirect contact with the metal tank wall.

In accordance with the present invention, a diaphragm tank is provided, which comprises an outer rigid shell, generally made of steel or other strong, usually metallic, material, but sometimes formed of rigid and reinforced, polymeric, composite materials; an inner tank separated from the outer tank wall by walls formed from the combination of a flexible diaphragm sealably connected to a lower more rigid wall, so as to separate the chamber containing liquid from the gas pressure chamber outside of the flexible diaphragm, between the two chambers; and a rigid liner sealingly connected with the flexible diaphragm and combining with the diaphragm to separate the water liquid chamber from the air gas chamber. A "liner" can also be substituted by a second diaphragm, wherein the water chamber is secured between the two diaphragms, one of which can be fully flexible and the second partially flexible or substantially rigid; at the location of the permanent seal between the lower wall and the liquid inlet connection, the lower wall becomes substantially rigid. The connector of this invention is preferably secured to the lower wall of the inner volume, i.e., a more rigid wall or flexible diaphragm separating the inner and outer tank volumes.

Further defining the present invention, the liquid inlet includes a male connection gland permanently affixed to, or integrated with, the interior liquid chamber wall, preferably the more rigid lower wall. The interior liquid chamber wall is preferably, a rigid or partially flexible diaphragm, separated from the rigid gas chamber outer wall within the pressure vessel so as to provide a gas and liquid-tight attachment between the inner chamber wall and the liquid inlet. The substantial integration of the male gland and inner chamber serves to eliminate additional elements or assemblies previously required to render fluid-tight a through wall connector, thereby avoiding and preventing manufacturing errors which often occurred during assembly.

SUMMARY OF INVENTION

The present invention provides for a substantially complete integration of the inner chamber wall and the through wall connector, referred to as a "male gland" so as to provide the necessary air and liquid fluid tightness in both directions between the pressure gas chamber and the inner liquid chamber, while eliminating complex mechanisms previously used in the industry. The portion of the male gland extending through lower inner wall into the liquid inner chamber is preferably a continuation of a flow pipe having a generally circular cross-section of a sufficient diameter to carry the intended flow of liquid into the inner chamber. Surrounding the pipe, but below the upper outer end of the flow pipe, a solid upper flange extends outwardly. The solid flange is formed integral with the pipe, and preferably of the same material as the pipe portion. The outer circumference of the upper flange is also preferably circular and has a diameter preferably at least about twice the outer diameter of the pipe portion extending through the lower inner wall into the inner chamber.

The pipe portion of the male gland extends downwardly through the outer gas-filled intermediate chamber and preferably is sufficiently long to extend through and below the bottom surface of the rigid outer wall of the tank. A lower flange extends outwardly from the pipe portion of the male gland longitudinally, vertically below the upper flange, at a location along the pipe designed to rest upon the inner surface of the rigid outer wall of the tank. The portion of the male gland extending below the rigid outer wall contains circumferential sealing means to maintain a gas and liquid tight seal between the male gland and the inlet pipe for the liquid flowing into the inner chamber. The male gland portion of the liquid inlet to the inner chamber is connected, in accordance with this invention, to the lower diaphragm, or liner, and is so formed as to assist in maintaining the separation between the outer chamber between the diaphragms and the outer rigid walls and the inner chamber within the inner diaphragm/liner walls.

The portion of the male gland extending below the rigid outer wall of the tank extends into, and is sealably secured to, the external liquid inlet pipe, which is preferably an elbow extending below the rigid bottom wall of the outer tank. The inner surface of the upper, vertically extending portion of the external inlet pipe forms a tight fit with the lower portion of the male gland. Extending outwardly around the outer circumference of the upper end of the external inlet pipe is a flange and a short lip extending upwardly from the flange and through the rigid outer wall of the tank, preferably to contact the lower surface of the lower flange of the male gland. The connection between the external inlet pipe and the male gland is maintained in a way so as to continue the integrity of the system and isolating the pressure chamber from any liquid contamination.

In operation, this system provides for the varying of pressure within this pressure gas chamber as the liquid chamber fills with the liquid, pushing the flexible diaphragm upwardly and outwardly, thereby reducing the volume of the sealed intermediate chamber and necessarily increasing gas pressure within the sealed intermediate gas chamber volume regardless of exterior pressure on the outer rigid tank wall. With the displacement of volume by the water liquid entering the water liquid chamber the pressure in both the water liquid and air gas chambers vary concurrently. Generally, the inner chamber is intended to hold a liquid, usually an aqueous liquid, and the outer chamber holds a compressible gas, which can be air or if desired an inert material such as nitrogen, helium or other inert gas that will preferably remain gaseous under any expected pressure at any potential ambient condition.

Further defining the present invention, the water inlet includes a male connection gland permanently affixed to, or formed as a part of, the lower interior chamber wall. The lower interior chamber wall can be a liner on the inner surface of the outer steel wall or an inner shell, which can be less flexible than the upper diaphragm, separate from the rigid chamber wall, in either case sealably connected to the male connection gland so as to maintain the gas and water-tight attachment between the inner chamber wall and the water inlet. The substantial integration of the male gland and inner chamber serves to eliminate additional elements or assemblies previously required to render fluid-tight a through wall connector, thereby avoiding and preventing manufacturing errors which often occurred during assembly.

The male gland is connected to an external water liquid inlet in a manner so as to insure that the liquid remains within the male gland and the inlet, exiting into the inner chamber, and without exiting into the pressure chamber of the tank. The usual plumbing sealing elements can be used between the portion of the exterior water liquid inlet extending out from the pressure tank and the water inlet pipe. In addition, there are further provided sealing elements between the exterior water liquid inlet and the pressure chamber outer tank wall so as to prevent the passage of air gas or water liquid into the pressure chamber, and thereby the changing of pressure within the tank pressure chamber.

BRIEF DESCRIPTION OF DRAWINGS

This invention will be more clearly understood after referring to the following detailed description considered in conjunction with the following drawings.

DETAILED DESCRIPTION OF CERTAIN EMBODIMENTS OF THE PRESENT INVENTION

Figure 1:
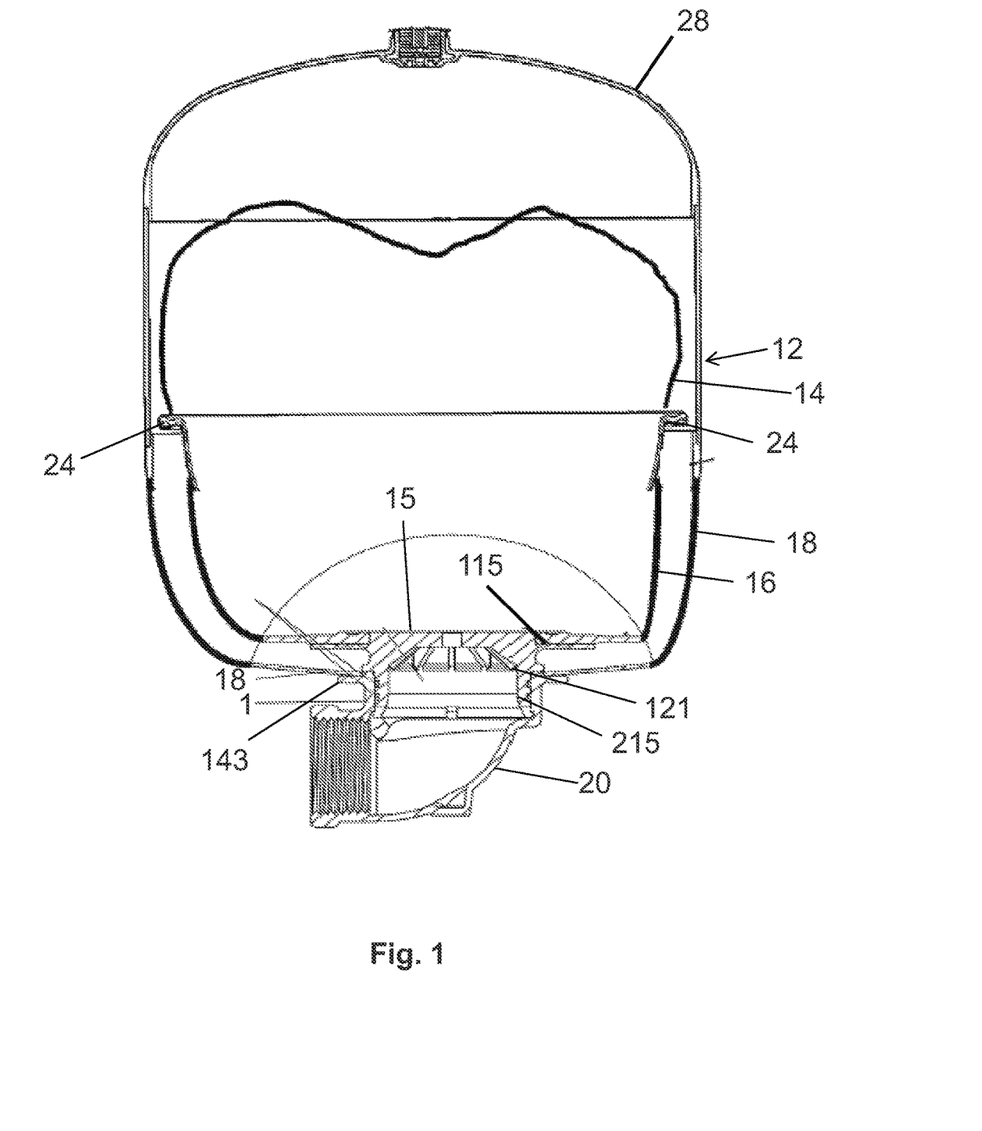
FIG. 1 is a cutaway, front elevation view of a two-chamber pressure tank having a partially extended inner diaphragm and a partially magnified view of the inlet connection between the inner liquid, chamber and the liquid inlet.
Figure 2:
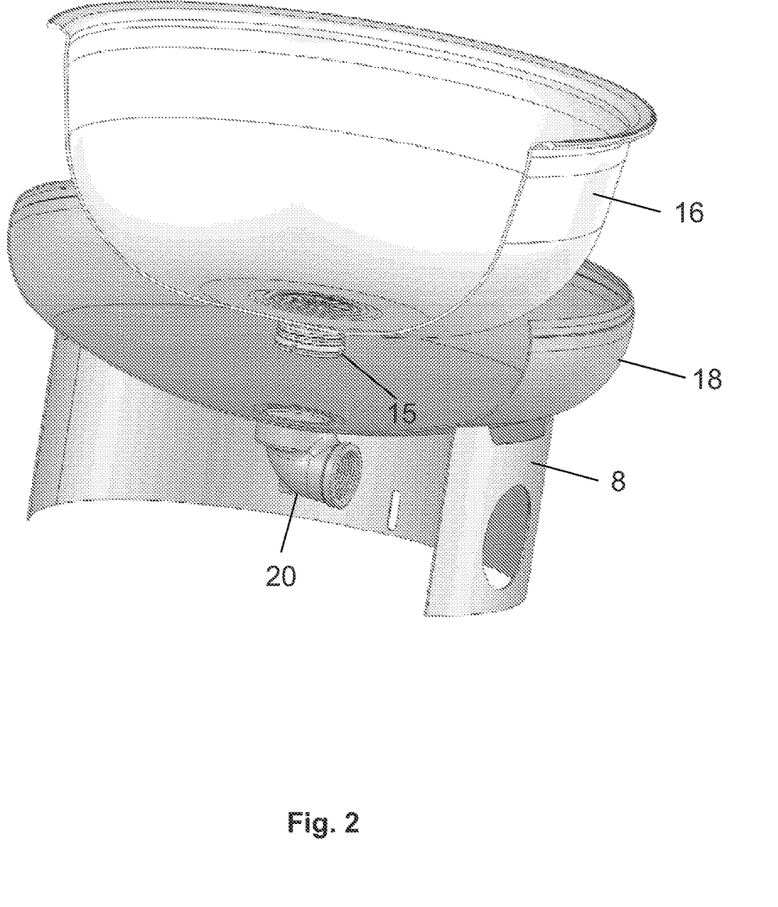
FIG. 2 is a magnified isometric view of the lower portion of the tank of FIG. 1 showing, in greater detail, the connection linkages and fluid gas isolating element of the joints.
Figure 3:
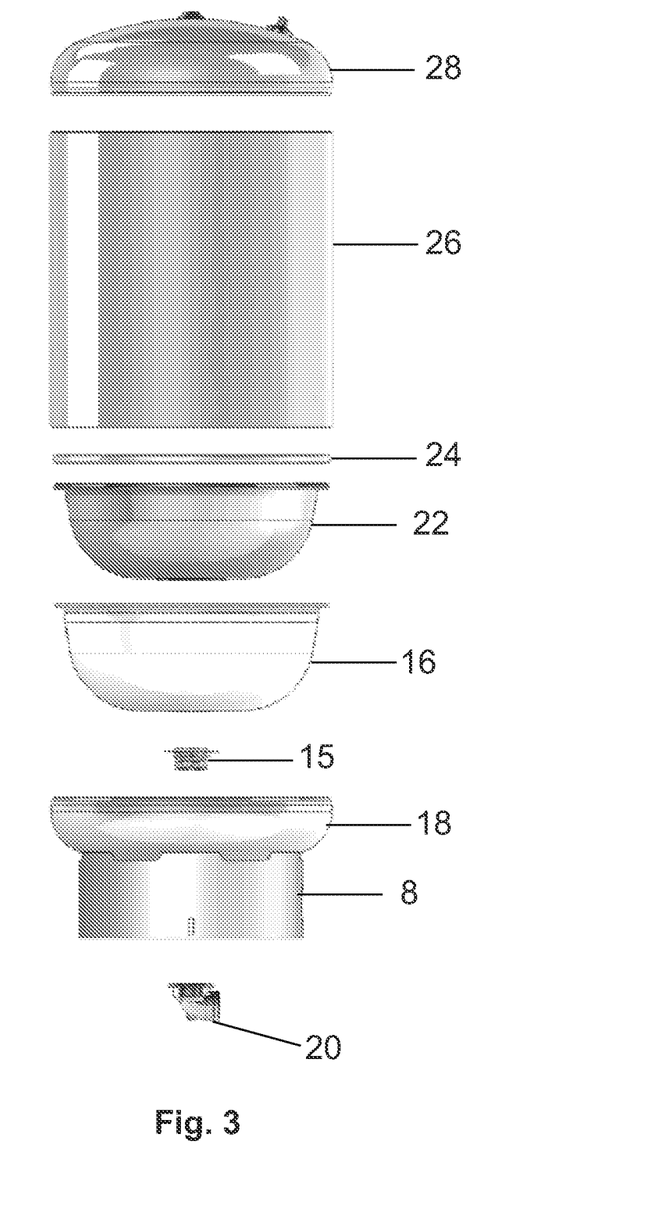
FIG. 3 is an exploded front elevation view of a two-chamber pressure tank of this invention.
Figure 4:
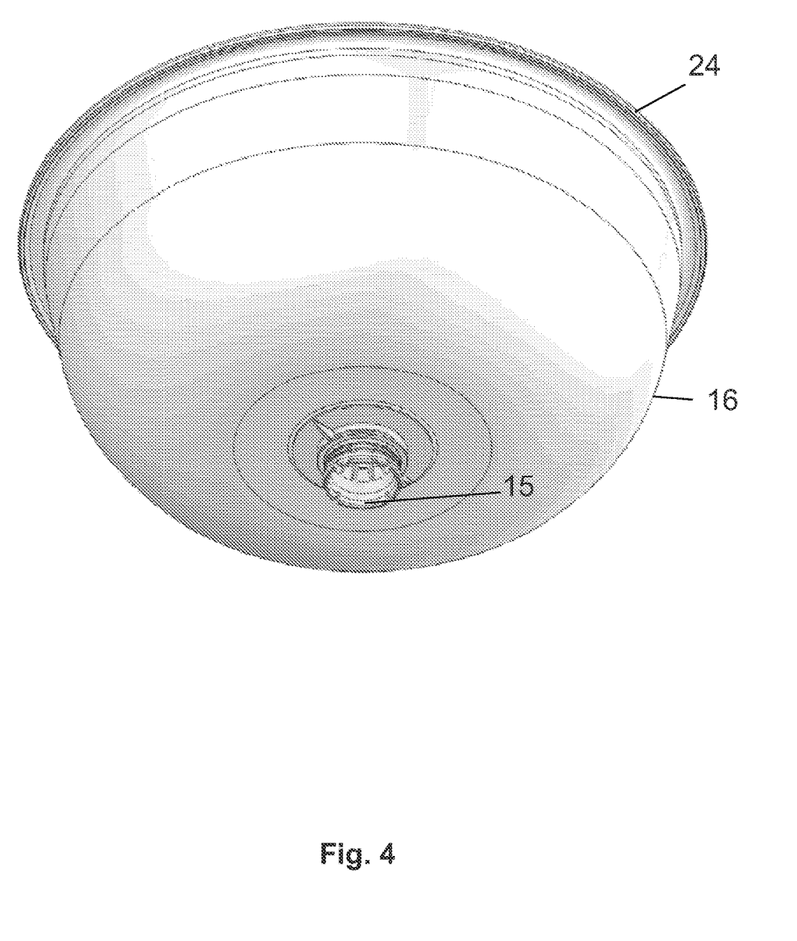
FIG. 4 is a magnified isometric view of the lower portion of the inner tank of FIG. 1.
Figure 5:
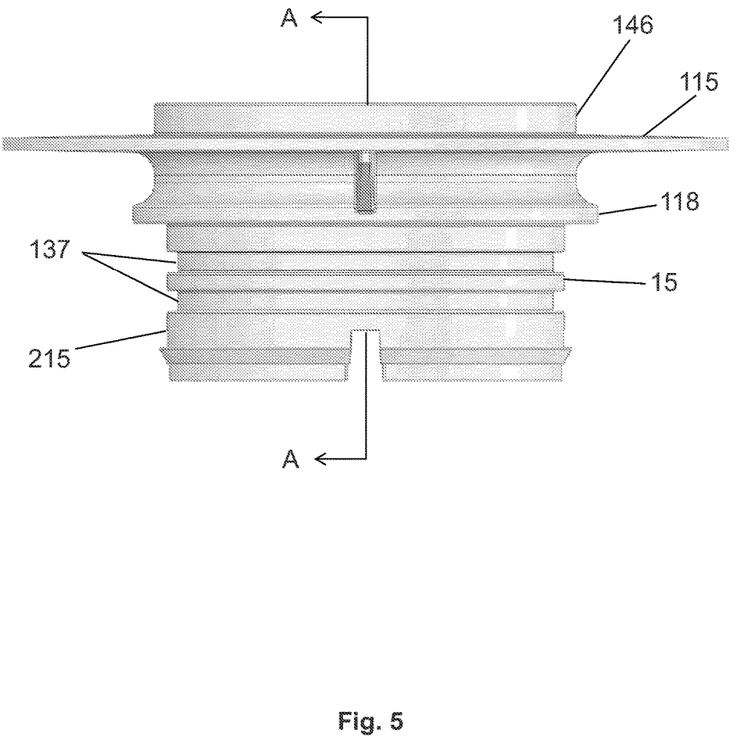
FIG. 5 is an enlarged front elevation view of one embodiment of the male gland of this invention.
Figure 6:
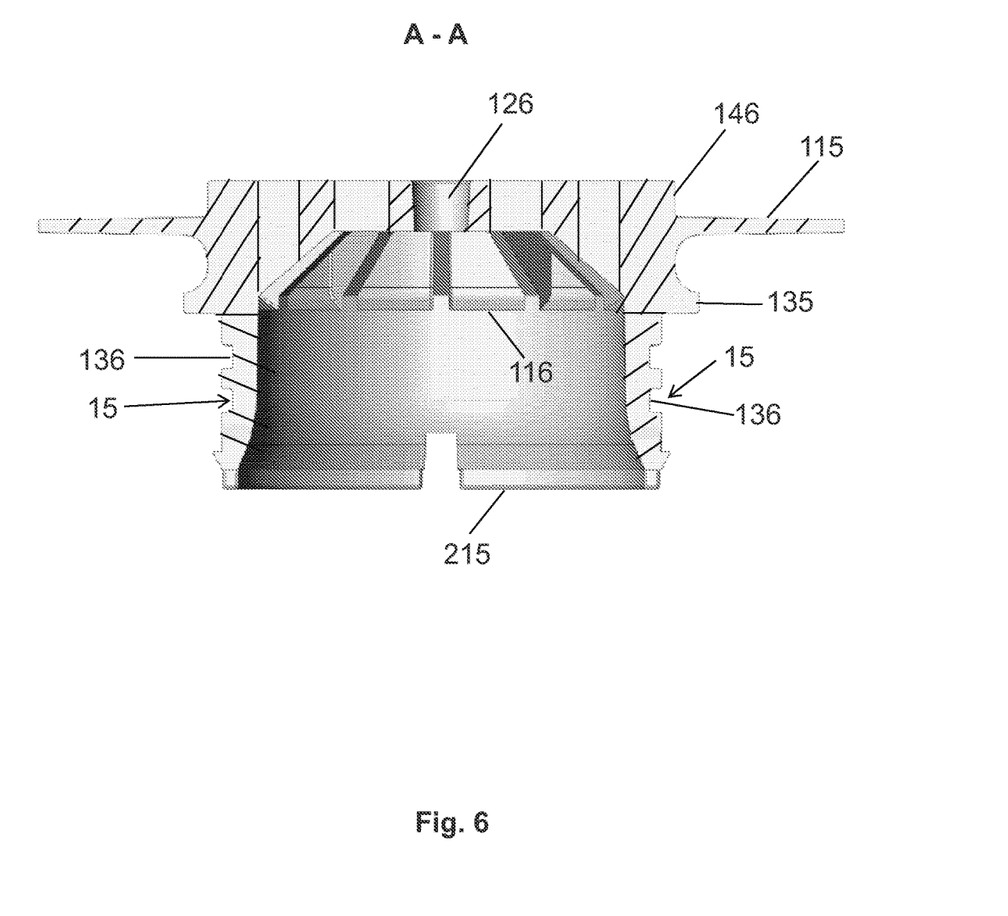
FIG. 6 is a cross-section view of the male gland of FIG. 5, taken along lines A-A.
Figure 7:
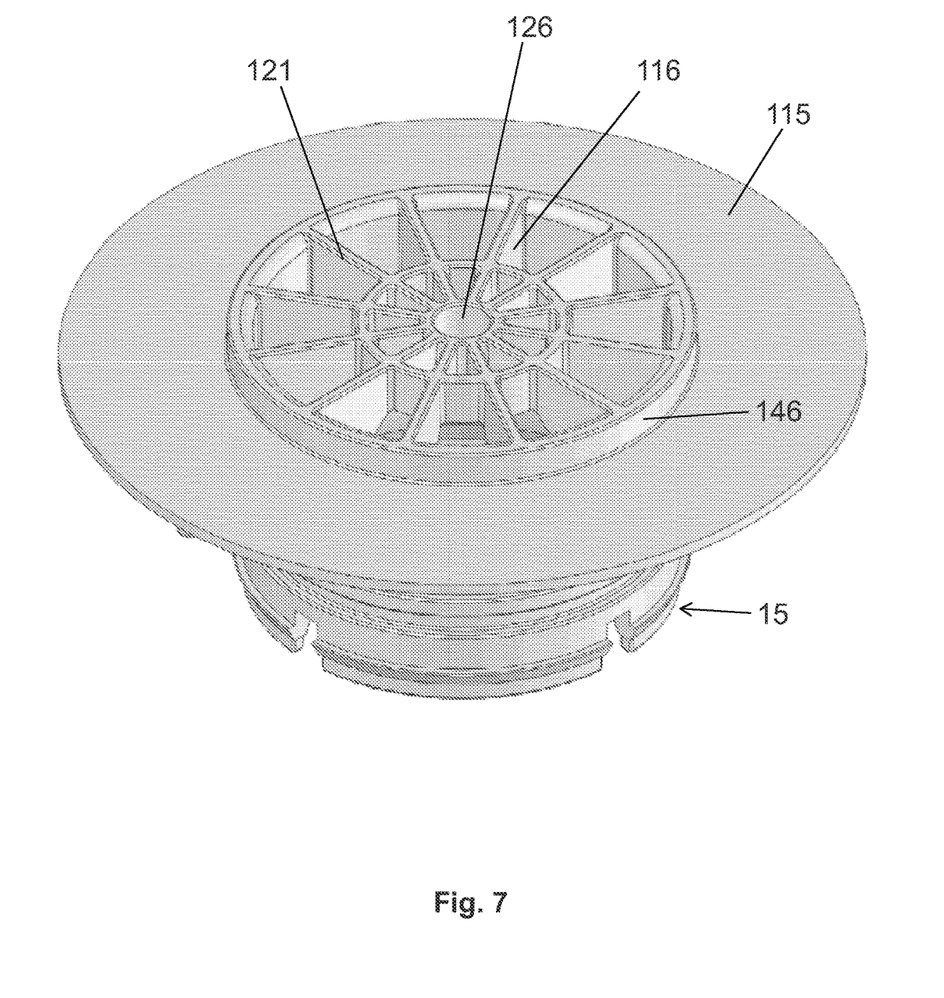
FIG. 7 is a top isometric view of the male gland of FIG. 5.
Figure 8:
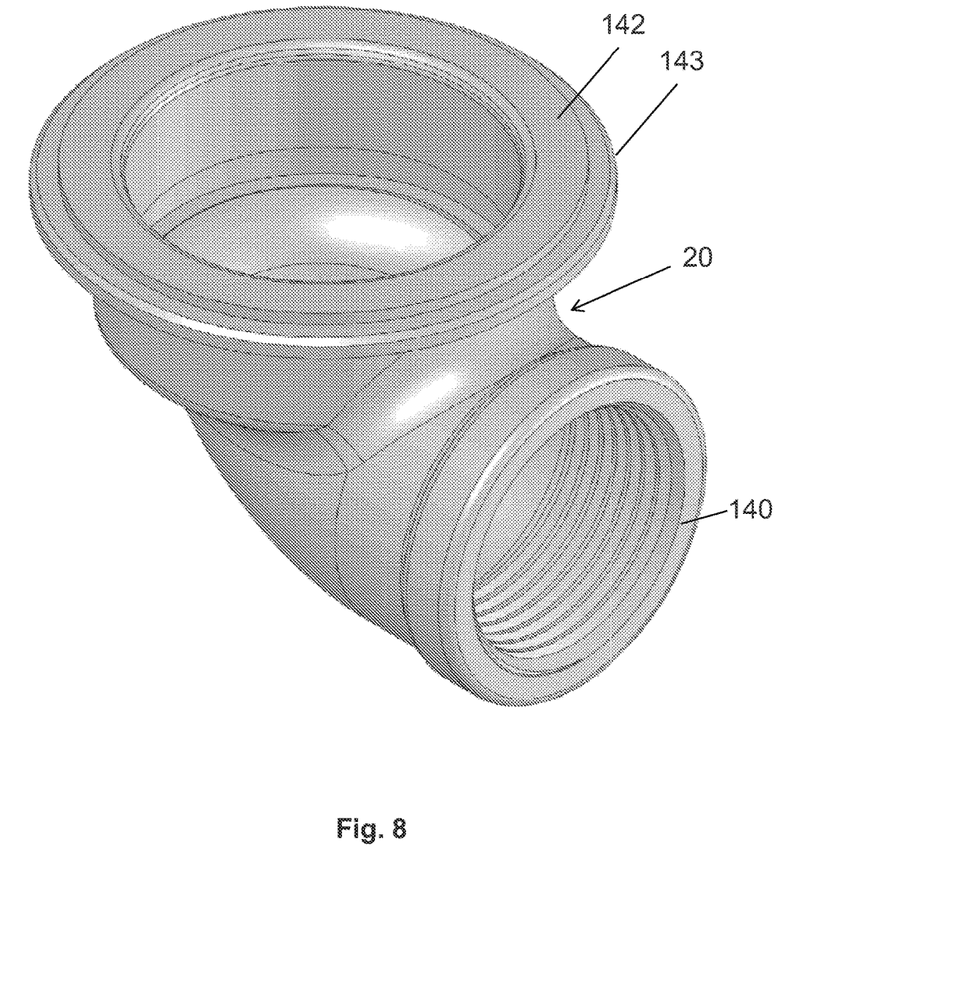
FIG. 8 is a side isometric view of the inlet elbow to the outer tank of FIG. 1.
Figure 9:
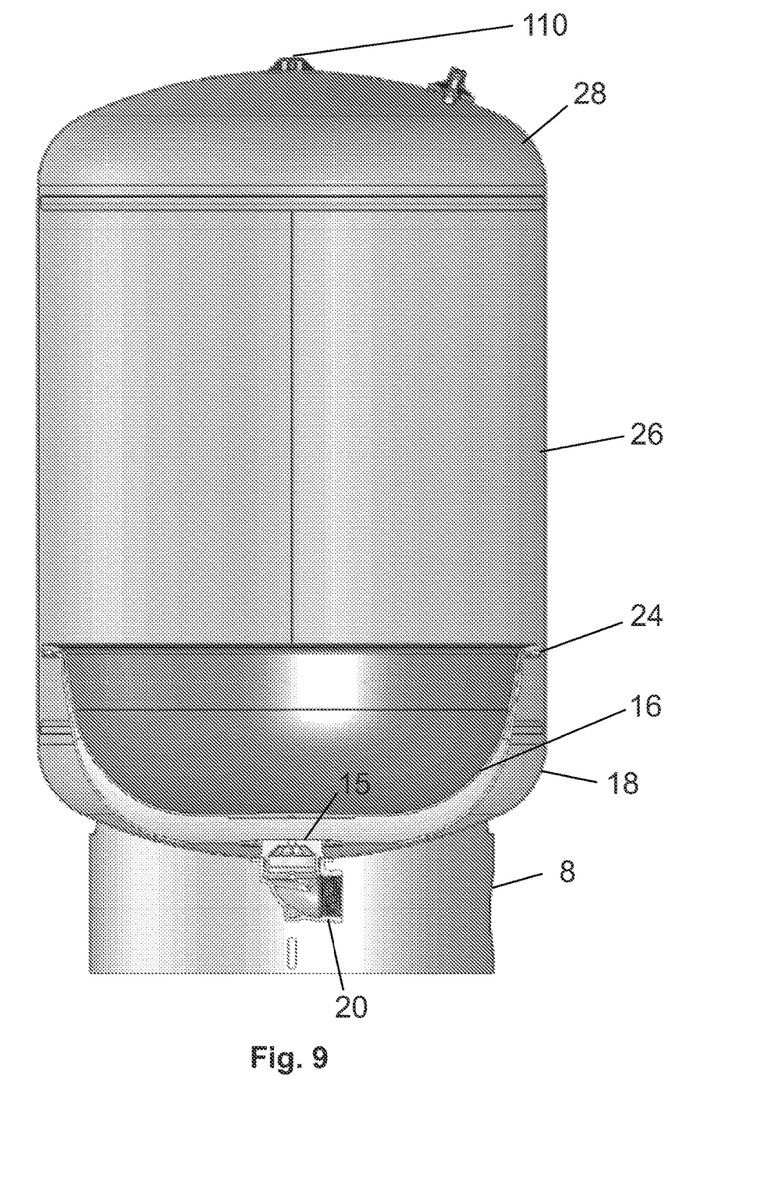
FIG. 9 is a partial cutaway, front elevation view of a two-chamber pressure tank of this invention.
Figure 10:
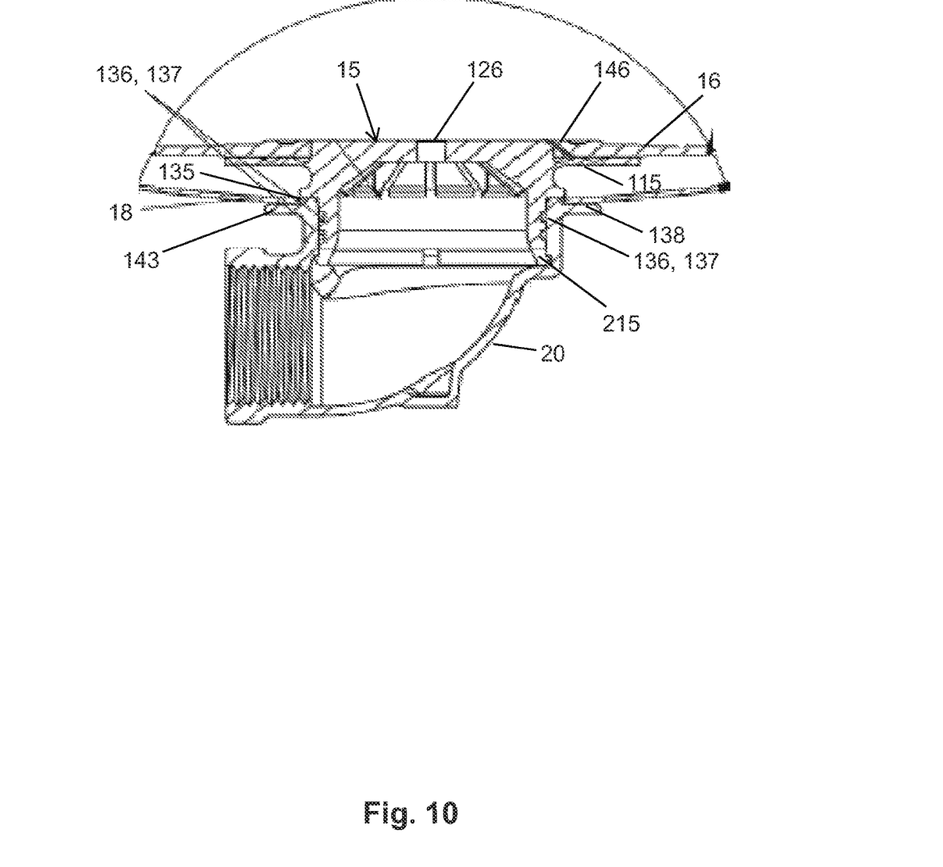
FIG. 10 is a magnified cross-sectional view of the male gland 15 with the immediately surrounding rigid outer tank wall, the inner liner wall and the sealing connections.

The assembly of the present invention provides fluidic communication between the exterior of the pressure vessel and the inner chamber, while maintaining the integrity of the pressure vessel and isolating the pressure gas chamber of the pressure vessel from the inner liquid holding chamber. The pressure gas chamber isolation from the inner chamber provides for pressure variance without being affected by the atmospheric pressure exterior of the pressure tank.

The outer wall of the tank 12 is preferably a steel shell formed from three sections, a top cap 28, a central cylinder 26 and a lower cup 18, formed of steel or other rigid, preferably metallic, material. Within the outer walls of the tank 12 is supported an inner liquid chamber defined by at least one flexible diaphragm 14 and one liner lower section 16; the lower section may be flexible, or rigid, or can be a liner secured, at least partially to the inner surface of the outer rigid tank wall 18. The lower section 16, in turn, is connected to the male gland 15 of the present invention. Other rigid materials which can be used for forming the rigid outer tank walls include other metals, especially aluminum or aluminum alloys, and certain polymers, such as polycarbonates or a composite structure.

The lower inner liner section 16 and the diaphragm 14 define an inner chamber for holding liquid entering through the inlet elbow 20 and male gland 15. As the liquid fills the inner volume, the pressure in the intermediate gas volume (between the diaphragm and the outer rigid tank walls) increases as the flexible diaphragm 14 is pushed upwardly and outwardly by the filling water, reducing the volume of the intermediate space, between the inner chamber and the outer rigid tank walls. The two portions of the wall of the inner volume, the diaphragm 14 and lower liner 16 are held together by a clamp ring 24, which provides a permanent bond without likelihood of either gas leaking into the inner volume or liquid leaking outwardly into the intermediate gas space. The flexible diaphragm 14 and liner 16 can be formed of polymers, such as polypropylene or polyethylene, or in the case of the flexible diaphragm, elastomeric compounds such as butyl or EPDM or SBR or neoprene or latex rubbers.

The male gland, generally designated by the numeral 15, is preferably rigid and can be formed of, e.g., reinforced polypropylene or polyethylene or any suitable copolymer, or from a polycarbonate, or other polymer, preferably a cross-linked thermoset polymer. The connection between the male gland and the liner/diaphragm is formed by, e.g., fusing the upper flange 115 of the male gland to the outer surface of the bottom of the lower liner 16. The fusion can be achieved by welding, i.e., melting a thermoplastic copolymer material, thereby welding the two elements permanently together, or by using an intermediate material compatible with the material forming both the upper flange 115 and the inner lower liner 16.

The male gland 15 is formed of generally rigid polymeric substances, such as reinforced polycarbonate, polypropylene or polyethylene or a suitable copolymer thereof, or a thermoset polymer. The connection between the male gland 15 and the lower surface of the inner liner wall 16 is formed by fusing the upper flange 115 of the male gland to the outer surface of the lower liner 16. The connection between the flange 115 and the outer surface of the liner 16 can be obtained by, for example, welding or by the use of intermediate materials that will fuse permanently to both materials, depending upon the relative weldability of the materials forming the flange and the lower liner.

As shown in the drawings, the male gland has a grating formed by vane elements 116, 121, 126 at its upper end, surrounded by the upper flange 115. These grating elements extend a short distance above the upper flange 115, surrounded by the stub pipe portion 146, and serve to direct any flow upwardly or downwardly from or to the metal inlet elbow 20.

The inlet elbow 20 is sealably connected to the lower extension 215 extending vertically downwardly from the outer wall of the tank. The metal inlet elbow 20 is joined with the lower portion of the male gland by a slip fit sealed by the use of O-rings 136 in the circumferential indentations 137 in the lower circumference 215 of the male gland. The distal end 140 of the elbow 20 can be connected by any suitable plumbing connection to an inlet and outlet line. Such connections include brazing, threaded connectors or other suitable means, which do not form a part of this inventional.

The upper flange 143 of the inlet elbow 20 is circumferentially welded to the outer surface of the metal outer wall of the tank 24. To further complete the sealing of the metal elbow to the metal outer wall of the tank, an additional O ring is provided between the outer circumference of the upper end 142 of the elbow, the rigid outer wall 138 of the tank, and the lower flange 118 of the male gland. In this manner the seals are formed between two different materials, i.e., the metal forming the elbow and the outer wall of the tank and the polymer forming the male gland 15 and the outer wall of the tank, so as to ensure that when water enters the inner chamber and expands the volume of the inner chamber by pushing the flexible diaphragm 14 upwardly and outwardly, and the pressure in the intermediate volume between the inner tank and the outer tank increases as a result, there is no leakage and, therefore, loss of pressure from the gas volume either into the liquid or to the exterior of the outer tank.

It is noted, indeed, that the way the system is mechanically connected, as water fills the inner chamber the force against the lower wall of the inner liner 16 increases, thereby pressing that inner liner wall against the upper flange 115 of the male gland, and thereby reinforcing the seal. Similarly, the male gland, around its lower flange 135, is similarly pressed against the interior of the outer shell wall 2. In this manner, as the water fills the tank and the pressure in the intermediate chamber between the diaphragm and the outer tank wall increases, the mechanical stressors on the gland and the wall of the two volumes increase, thereby increasing the bonding pressures between the surfaces, and thus reducing the likelihood of any leakage between the two volumes.

What is claimed is:

1. An expansion tank comprising a rigid outer shell having a lower wall, an inner chamber, and a bladder disposed within the outer shell wherein the bladder comprises a flexible, upper diaphragm having a peripheral edge and a second, bottom diaphragm having a peripheral edge, wherein the peripheral edges of the diaphragms are sealed to one another to form a circumferential seam and wherein the inner chamber is defined by the two diaphragms of the bladder, the inner chamber being fluidically isolated from an intermediate chamber between the bladder and the outer tank shell;

a male gland extending through an orifice in the bottom, second diaphragm to and through the lower wall of the rigid outer shell of the expansion tank, wherein the male gland comprises an upper flange which is permanently, sealingly connected with the lower, second diaphragm, so as to form a tight seal with the second diaphragm, which seal would be fully fluid tight to both gas and liquids; and the portion of the male gland extending below the second diaphragm to extend through the rigid outer shell to be sealingly connected with a liquid inlet pipe, so as to permit liquid to flow into the inner chamber, which would be fully sealed away from the intermediate chamber of the tank to allow for pressurization of the gas in the intermediate chamber, as water fills the inner chamber, pushing the flexible diaphragm upwardly and outwardly into the intermediate chamber.

2. The expansion tank of claim 1, wherein the upper flange of the male gland is permanently, sealingly connected with the lower, second diaphragm, by welding the male gland and the lower, second diaphragm together, and the two surfaces are formed of compatible thermoplastic materials.

3. The expansion tank of claim 1, further comprising an intermediate layer of mutually compatible material between the upper flange of the male gland and the lower, second diaphragm to permanently, sealingly connect the upper flange of the male gland with the lower, second diaphragm, by welding the mutually compatible material to both of the male gland and the lower, second diaphragm.

4. The expansion tank of claim 1, further comprising an intermediate layer of mutually compatible material between the upper flange of the male gland and the lower, second diaphragm to permanently, sealingly connect the upper flange of the male gland with the lower, second diaphragm, by adhesively connecting the upper flange of the male gland to the lower, second diaphragm.

5. The expansion tank of claim 1, wherein the liquid inlet pipe is sealingly connected with the male gland by an intermediate circumferential sealing member, so as to form a tight seal therebetween.

6. The expansion tank of claim 1, wherein the liquid inlet pipe is sealingly connected with the outer rigid wall by welding, the inlet pipe and the rigid outer tank wall both being formed of compatible metals.

7. The expansion tank of claim 1, wherein the lower liner is formed of a substantially rigid polymeric material.

8. The expansion tank of claim 1, wherein the upper flexible diaphragm is formed of a material selected from flexible thermoplastic materials and elastomeric polymers.

* * * * *